(12) United States Patent
Chen

(10) Patent No.: US 6,393,935 B1
(45) Date of Patent: May 28, 2002

(54) BRAKE LEVER WITH PLASTIC MATERIAL ATTACHED THERETO

(76) Inventor: Tse-Min Chen, No. 14, Lane 69, Tian Jin Road, Section 4, Pei Tung Dist., Taichung City (TW)

( * ) Notice: Subject to any disclaimer, the term of this patent is extended or adjusted under 35 U.S.C. 154(b) by 0 days.

(21) Appl. No.: 09/612,951

(22) Filed: Jul. 10, 2000

(51) Int. Cl.⁷ .......................... G05G 1/04; G05G 13/00; G05G 1/10
(52) U.S. Cl. .......................... 74/523; 74/502.2; 74/489; 74/558; 74/558.5; 74/551.8
(58) Field of Search ................................ 74/502.2, 489, 74/523, 543, 558, 558.5, 551.8

(56) References Cited

U.S. PATENT DOCUMENTS

| | | | | | |
|---|---|---|---|---|---|
| 3,733,922 A | * | 5/1973 | Tripp | ........................... | 74/523 |
| 3,803,941 A | * | 4/1974 | Yoshikawa | .................... | 74/523 |
| 4,193,318 A | * | 3/1980 | Golobay | ....................... | 74/489 |
| 4,916,967 A | * | 4/1990 | Nakamura | .................. | 74/502.2 |
| 5,123,296 A | * | 6/1992 | Chang | ........................ | 74/502.2 |
| 5,549,017 A | * | 8/1996 | Lin | ........................... | 74/558.5 |

* cited by examiner

Primary Examiner—Vinh T. Luong

(57) ABSTRACT

A brake lever includes a metal body and a connection end is on one of two ends of the body so as to be connected to a handlebar of a bicycle. A longitudinal groove is defined in the body located between two ridges of the body. Each ridge has a lot of notches defined in an inside thereof. The longitudinal groove and the notches are filled with plastic material.

1 Claim, 3 Drawing Sheets

BRAKE LEVER WITH PLASTIC MATERIAL ATTACHED THERETO

FIELD OF THE INVENTION

The present invention relates to a brake lever structure that has a metal body made by way of casting and a plurality of grooves in the body so as to fill plastic material in the groove. The plastic material will not separate from the body.

BACKGROUND OF THE INVENTION

A conventional brake lever for bicycles or motorcycles generally made by metal and a lot of manufacturing processes. The manufacturing cost for the brake lever is not cheap because different types of machines or equipment are required. A plastic sleeve is mounted to the body of the brake lever so that the user can hold the brake lever comfortably. Nevertheless, it is experienced that the plastic sleeve often slips off from the metal body of the brake lever because there is less friction between the metal brake lever and the plastic sleeve. This could be dangerous for the user when the plastic sleeve is separated from the metal brake lever when the user pulls the brake lever.

The present invention intends to provide a brake lever that has grooves defined in at least one of two sides of the body of the metal brake lever, plastic material is filled in the grooves so that the plastic material is firmly attached to the metal brake lever.

SUMMARY OF THE INVENTION

In accordance with one aspect of the present invention, there is provided a structure of a brake lever and comprising a body having a connection end on an end of the body so as to be connected to a handlebar of a bicycle or motorcycle. A longitudinal groove is defined in the body and located between two ridges on the body. A plurality of transverse grooves are defined in a bottom defining the longitudinal groove and a plastic material filled in the longitudinal groove and the transverse grooves.

The object of the present invention is to provide a brake lever that has grooves defined in the metal body so as to fill plastic material in the grooves. The plastic material will not be separated from the metal brake lever.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
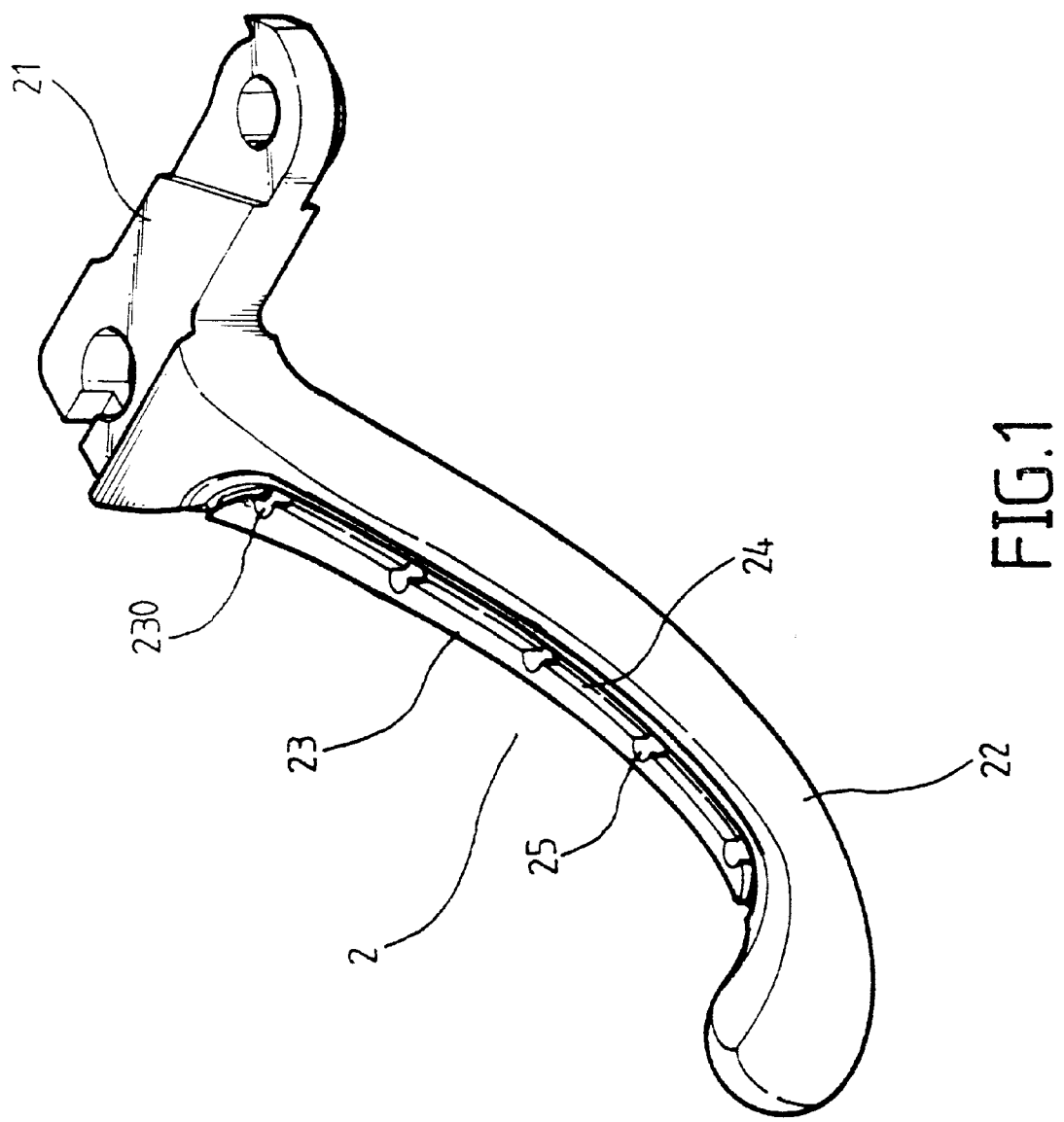
FIG. 1 is a perspective view to show a brake lever of the present invention wherein no plastic material is attached to the metal body of the brake lever.

Referring to FIG. 1, the brake lever 2 in accordance with the present invention comprises a metal body 22 which is made by way of casting and a connection end 21 is on an end of the body 22 so as to be connected to a handlebar of a bicycle or motorcycle. A longitudinal groove 24 is defined in the body 22 and the longitudinal groove 24 is located between two ridges 23 on the body 22. A plurality of transverse grooves 25 are defined in a bottom defining the longitudinal groove 24. A plurality of notches 230 are defined in an inside of each of the two ridges 23. Each pair of aligned notches 230 communicates with the transverse grooves 25.

Figure 2:
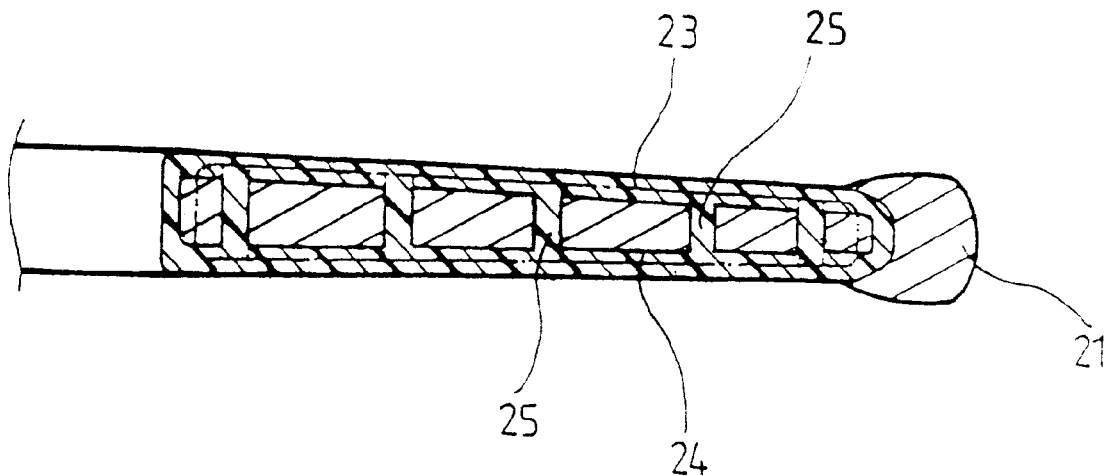
FIG. 2 is a cross-sectional view taken along the plane 2—2 in FIG. 3 to show the brake lever in which the plastic material is filled, and FIG. 3 a is a perspective view to show the brake lever of the present invention with the plastic material attached to the metal body.
Figure 3:
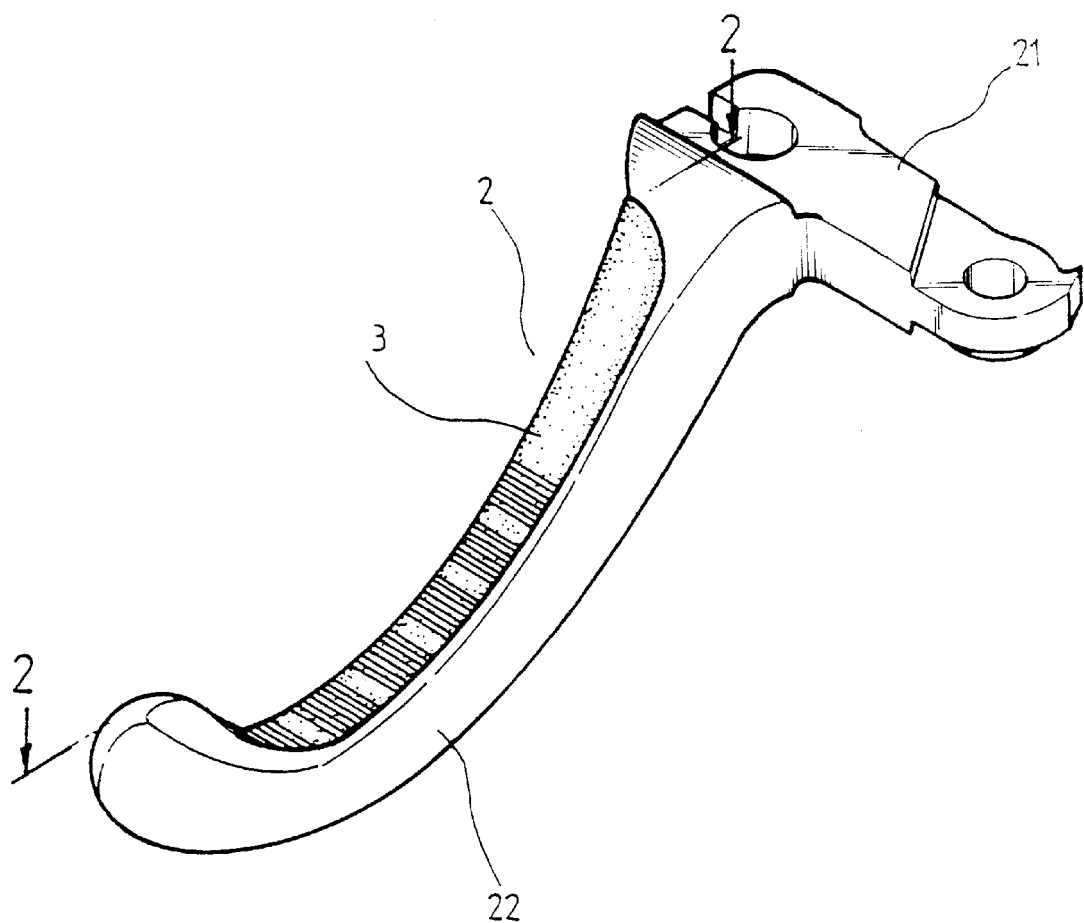

Referring to FIGS. 2 and 3, the metal body 22 is then put in a mold and plastic material is ejected in the mold to fill in the the longitudinal groove 24, the transverse grooves 25 and the notches 230.

The material 3 is firmly engaged with the longitudinal groove 24, the transverse grooves 25 and the notches 230 so that the material will not slip or separate from the metal brake lever 2.

The processes for manufacturing the brake lever 2 is simple because the metal brake lever 2 is made by way of casting and the plastic material 3 is attached to the body 22 by plastic material ejection machine so that the maufacturing cost is lowered.

While we have shown and described various embodiments in accordance with the present invention, it should be clear to those skilled in the art that further embodiments may be made without departing from the scope and spirit of the present invention.

What is claimed is:

1. A brake lever comprising:

a body having a connection end on an end of said body and at least one longitudinal groove defined in said body, said longitudinal groove located between two ridges on said body;

a plurality of transverse grooves defined in a bottom defining said longitudinal groove, a plurality of notches defined in an inside of each of said two ridges and communicating with said transverse grooves, and a plastic material filled in said longitudinal groove and said transverse grooves.

* * * * *